United States Patent
Kim et al.

(10) Patent No.: US 8,144,075 B2
(45) Date of Patent: Mar. 27, 2012

(54) DISPLAY SYSTEM FOR OUTPUTTING ANALOG AND DIGITAL SIGNALS TO A PLURALITY OF DISPLAY APPARATUSES, SYSTEM AND METHOD

(75) Inventors: Yong-sul Kim, Suwon-si (KR); Young-chan Kim, Uiwang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 447 days.

(21) Appl. No.: 12/492,454

(22) Filed: Jun. 26, 2009

(65) Prior Publication Data

US 2010/0085485 A1   Apr. 8, 2010

(30) Foreign Application Priority Data

Oct. 8, 2008   (KR) ........................ 10-2008-0098824

(51) Int. Cl.
*G09G 5/00* (2006.01)
(52) U.S. Cl. ......................................... 345/3.1; 345/3.3
(58) Field of Classification Search ............ 345/1.1–3.3, 345/3.4, 156–173
See application file for complete search history.

(56) References Cited

U.S. PATENT DOCUMENTS

| | | | | |
|---|---|---|---|---|
| 6,897,882 | B1 * | 5/2005 | Kim ............................... | 345/659 |
| 6,946,310 | B2 * | 9/2005 | Koyama .......................... | 438/27 |
| 7,649,520 | B2 * | 1/2010 | Koyama .......................... | 345/99 |
| 7,830,332 | B2 * | 11/2010 | Park et al. ...................... | 345/1.1 |
| 2005/0078052 | A1 * | 4/2005 | Morichika ...................... | 345/3.3 |
| 2005/0128176 | A1 * | 6/2005 | Oshima et al. ................. | 345/102 |
| 2005/0253784 | A1 * | 11/2005 | De Greef et al. .............. | 345/63 |
| 2006/0055633 | A1 * | 3/2006 | Koyama .......................... | 345/55 |
| 2007/0211035 | A1 * | 9/2007 | Marcus et al. ................. | 345/169 |
| 2008/0036971 | A1 * | 2/2008 | Hasegawa ....................... | 353/30 |
| 2009/0303174 | A1 * | 12/2009 | Chin .............................. | 345/156 |
| 2010/0007606 | A1 * | 1/2010 | Shkolnikov ................... | 345/161 |

FOREIGN PATENT DOCUMENTS

KR   10-2004-0072421 A   8/2004

* cited by examiner

*Primary Examiner* — Nitin Patel
(74) *Attorney, Agent, or Firm* — Sughrue Mion, PLLC

(57) ABSTRACT

There are provided a display apparatus, a display system and a display method. The display apparatus includes: a first input unit through which a first image signal having a first type is inputted; an image processing unit which processes the first image signal for display; a converting unit which converts the type of the first image signal into a second type different from the first type; and an output unit which outputs the first image signal converted into the second type to a next connected display apparatus.

19 Claims, 9 Drawing Sheets

DISPLAY SYSTEM FOR OUTPUTTING ANALOG AND DIGITAL SIGNALS TO A PLURALITY OF DISPLAY APPARATUSES, SYSTEM AND METHOD

CROSS-REFERENCE TO RELATED APPLICATION

This application claims priority from Korean Patent Application No. 10-2008-0098824 filed on Oct. 8, 2008 in the Korean Intellectual Property Office, the disclosure of which is incorporated herein by reference.

BACKGROUND OF INVENTION

1. Field of Invention

Apparatuses and methods consistent with the present invention relate to a display apparatus and a display system which can receive an analog signal and a digital signal and output a digital signal to a connected display apparatus, and further output an optimized analog image to the connected display apparatus, and a display method thereof.

2. Description of Related Art

Recently, according to developments of the display technology, it is possible to display the same image on a plurality of display apparatuses, for example, for a multi-party conference, which will be referred to as a 'conference room system'.

Figure 1:
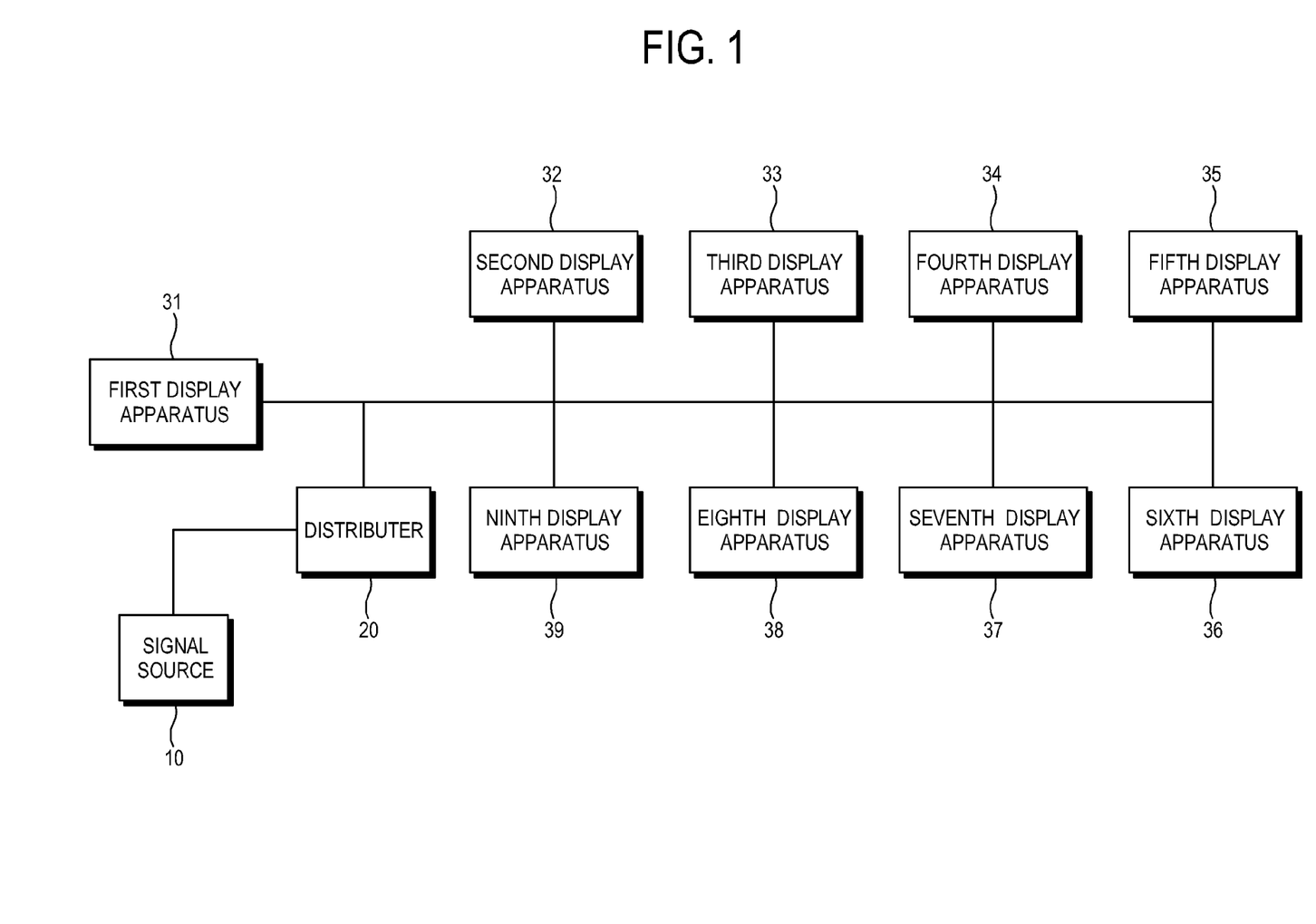
FIG. 1 is a block diagram illustrating a conventional conference room system.

FIG. 1 is a block diagram illustrating a conventional conference room system. As shown, the conference room system includes a signal source 10, a distributor 20 and a plurality of display apparatuses 31 to 39.

The signal source 10 generates a signal and outputs the generated signal to the distributor 20. In this respect, the signal source 10 may be embodied as a desktop computer, a digital television, a set top box, a digital video recorder (DVR), or the like.

The distributor 20 distributes the signal outputted from the signal source 10 to the plurality of display apparatuses 31 to 39 which are connected to the distributor 20. Specifically, the distributor 20 receives one input signal and transmits N output signals, in a winding format. The N output signals are transmitted to the respective display apparatuses 31 to 39. Here, the number N may correspond to the number of the display apparatuses 31 to 39. As necessary, a user may connect the plurality of display apparatuses 31 to 39 to the distributor 20 having a desired number of output ports.

The respective display apparatuses 31 to 39 display the signals received from the distributor 20.

In this way, in the conventional conference room system, a signal is distributed to a plurality of display apparatuses through a distributor. In other words, the distributor is necessary to realize the conventional conference room system.

Further, since the distributor divides an input signal into a number N in the winding format through single distribution, the divided signals may deteriorate in quality as the number N increases. This causes deterioration in the quality of the images to be displayed on the plurality of display apparatuses.

SUMMARY OF INVENTION

Accordingly, it is an aspect of the present invention to provide a display apparatus and a display system which can output a single signal regardless of the type of an input signal and display an image without image deterioration even in the case of a plurality of display apparatuses, and a display method thereof.

Additional aspects of the present invention will be set forth in part in the description which follows and, in part, will be obvious from the description, or may be learned by practice of the present invention.

The foregoing and/or other aspects of the present invention can be achieved by providing a display apparatus including: a first input unit through which a first image signal having a first type is inputted; an image processing unit which processes the first image signal for display; a converting unit which converts the type of the first image signal into a second type different from the first type; and an output unit which outputs the first image signal converted into the second type to a next connected display apparatus.

The display apparatus may further include a second input unit through which a second image signal having the second type.

The image processing unit may process the input second image signal for display.

The output unit may output the second image signal to the next connected display apparatus.

The first image signal may be an analog signal, and the second image signal may be a digital signal.

The second input unit may include a TMDS distributor which distributes the second image signal to the image processing unit and the output unit.

The display apparatus may further include a controlling unit which controls the converting unit to convert the type of the first image signal on the basis of an optimal output value of an image outputted on the next connected display apparatus.

The controlling unit may control the converting unit to convert the type of the first image signal on the basis of an optimal output value of at least one of a phase and color of the image screen.

The controlling unit may perform a display data channel command interface (DDC CI) communication with the next connected display apparatus.

Another aspect of the present invention may be achieved by providing a display system including a first display apparatus and a second display apparatus which are connected each other, the first display apparatus processing an input first image signal having a first type or an input second image signal having a second type different from the first type for display, converting the type of the first image signal into the second type, and outputting the first image signal converted into the second type or the second image signal to the second display apparatus connected to the first display apparatus, and the second display apparatus processing the first image signal converted into the second type or the second image signal which is inputted from the first display apparatus for display, and outputting the first image signal converted into the second type or the second image signal to a next connected display apparatus.

The first display apparatus may convert the type of the first image signal on the basis of an optimal output value of an image screen outputted on the second display apparatus.

Still another aspect of the present invention may be achieved by providing a display method in a display apparatus including: receiving a first image signal having a first type; processing the first image signal for display; converting the type of the first image signal into a second type different from the first type; and outputting the first image signal converted into the second type to a next connected display apparatus.

The display method may further include receiving a second image signal having the second type.

The display method may further include processing the second image signal for display.

The display method may further include outputting the second image signal to the next connected display apparatus.

The first image signal may be an analog signal, and the second image signal may be a digital signal.

The display method may further include distributing the second image signal to an image processing unit and an output unit which are provided in the display apparatus.

The display method may further include converting the type of the first image signal on the basis of an optimal output value of an image screen outputted on the next connected display apparatus.

The converting may include converting the type of the first image signal on the basis of at least one of a phase and color of the image screen.

The display method may further include performing a display data channel command interface (DDC CI) communication with the next connected display apparatus.

According to the present invention, input signals having various types can be outputted as a single output signal. Further, an analog signal as well as a digital signal can be optimized for output, thereby effectively realizing a display system including a plurality of display apparatuses.

BRIEF DESCRIPTION OF DRAWINGS

The above and/or other aspects of the present invention will become apparent and more readily appreciated from the following description of the exemplary embodiments, taken in conjunction with the accompanying drawings, in which.

DETAILED DESCRIPTION OF EXEMPLARY EMBODIMENTS

Reference will now be made in detail to the embodiments of the present invention, examples of which are illustrated in the accompanying drawings, wherein like reference numerals refer to like elements throughout. The exemplary embodiments are described below so as to explain the present invention by referring to the figures. Redundant description to different embodiments may be omitted for simplicity of description.

Figure 2:
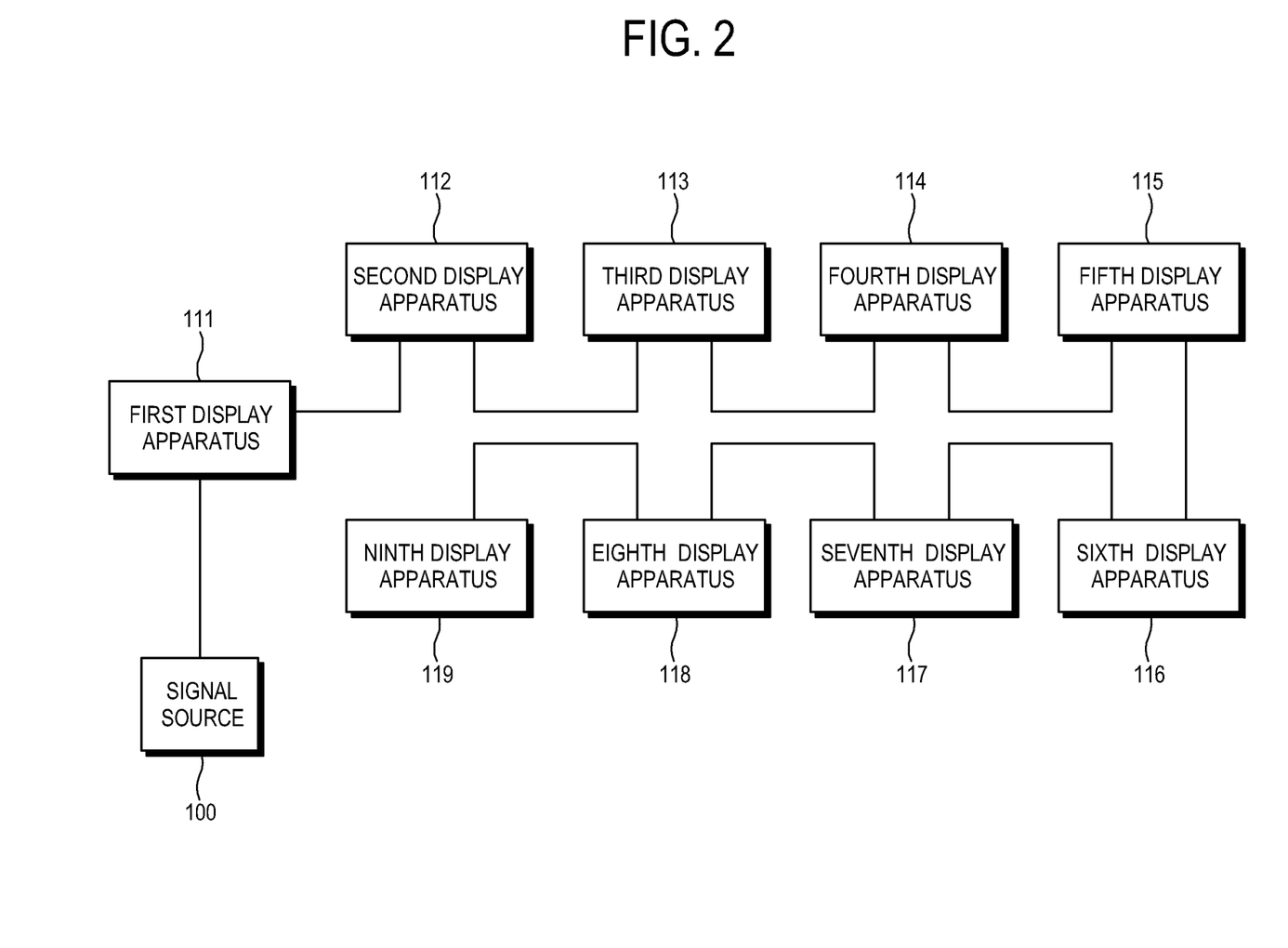
FIG. 2 is a block diagram illustrating a conference room system according to an exemplary embodiment of the present invention.

FIG. 2 schematically illustrates an overall configuration of a conference room system according to an exemplary embodiment of the present invention.

The conference room system may be embodied as a plurality of display apparatuses which is serially connected with each other. However, the present invention is not limited thereto, and the display apparatuses may be connected in different methods.

The conference room system may include a signal source 100 and a plurality of display apparatuses 111 to 119 which are connected each other.

The signal source 100 generates a signal and outputs the generated signal to the display apparatus connected thereto. More specifically, the signal source 100 outputs the signal to the first display apparatus 111.

The display apparatuses 111 to 119 may be embodied as a PC monitor. Further, the display apparatuses may be embodied as an electronic device for performing bi-directional communication and image processing, such as a digital TV, a desk top computer and a lap top computer.

Each of the plurality of display apparatuses 111 to 119 outputs an input signal to the next display apparatus. That is, the first display apparatus 111 outputs the input signal to the second display apparatus 112 and the second display apparatus 112 outputs the signal inputted from the first display apparatus 111 to the third display apparatus 113. In this way, the signal outputted from the signal source 100 may be transmitted to the last display apparatus 119 through the connected display apparatuses.

Conventionally, the signal from the signal source is outputted to each display apparatus through the distributor. However, in the present invention, the signal from the signal source can be transmitted through the connected display apparatuses without the distributor.

Hereinafter, the display apparatus in the described conference room system will be described in more detail.

Figure 3:
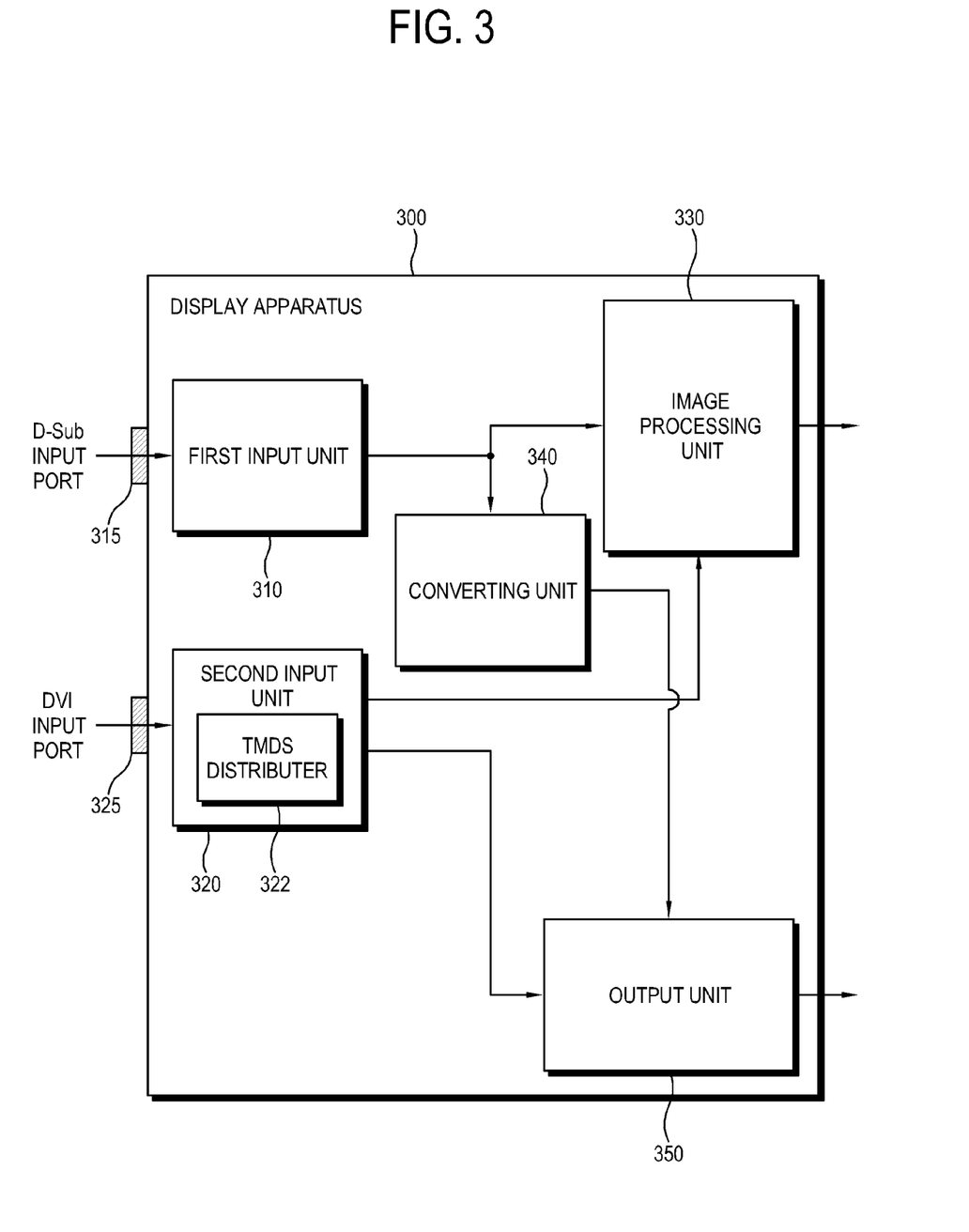
FIG. 3 is a block diagram illustrating a configuration of a display apparatus according to an exemplary embodiment of the present invention.

FIG. 3 illustrates a configuration of a display apparatus 300 according to an exemplary embodiment of the present invention.

The display apparatus 300 may include a first input unit 310, a second input unit 320, an image processing unit 330, a converting unit 340 and an output unit 350. In this respect, the second input unit 320 may include a transition minimized differential signaling (TMDS) distributor 322.

The first input unit 310 and the second input unit 320 respectively receives image signals which are different in signal types. More specifically, the first input unit 310 receives a first image signal of a first type, whereas the second input unit 320 receives a second image signal of a second type different from the first type.

According to the exemplary embodiment of the present invention, the first image signal may be an analog signal and the second image signal may be a digital signal. Here, the first input unit 310 may be connected to a D-Sub (subminiature) input terminal 315 for receiving an analog signal. Also, the second input unit 320 may be connected to a digital visual interactive (DVI) input terminal 325 for receiving a digital signal. The D-Sub and the DVI will be further described with reference to FIG. 5.

Hereinafter, it is assumed that the first image signal is an analog signal and the second image signal is a digital signal. However, the present invention is not limited thereto, and the first image signal and the second image signal may be any different signals which are different in signal types.

The image signals which are respectively inputted through the first input unit 310 and the second input unit 320 are displayed through the display apparatus 300 and at the same time outputted to the next connected display apparatus.

To this end, the first image signal inputted through the first input unit 310 is provided to the image processing unit 330 and the converting unit 340. Here, as the first image signal is the analog signal, the first image signal can be provided in a winding format according to its characteristic.

The second image signal inputted through the second input unit 320 is provided to the image processing unit 330 and the output unit 350. As the second image signal is the digital signal, the second image signal can not be provided in the winding format. Accordingly, a separate distributor is required. In this case, the second input unit 320 may include a transition minimized differential signaling (TMDS) distributor 322 for respectively distributing the second image signal to the image processing unit 330 and the output unit 350.

The image processing unit 330 processes the input first image signal or the second image signal for display. For this purpose, the image processing unit 330 may include a liquid crystal display (LCD), an organic light emitting display (OLED), a plasma display panel (PDP), or the like.

The converting unit 340 converts the type of the first image signal into the second type. The converted first image signal of the second type is outputted through the output unit 350.

The output unit 350 outputs the first image signal converted into the second type or the second image signal to the next connected display apparatus.

According to an exemplary embodiment of the present invention, the converting unit 340 may convert the analog signal into the digital signal.

The analog signal changes in input impedance characteristic according to the number of the connected display apparatuses due to the characteristic of an analog signal. This causes deterioration in the quality of the image in the N-th connected display apparatus.

To overcome this problem, according to the present invention, an input analog signal is converted into a digital signal, and then, outputted to the next connected display apparatus. Accordingly, even in the case that several tens of monitors are connected, the quality of images does not deteriorate.

Figure 4:
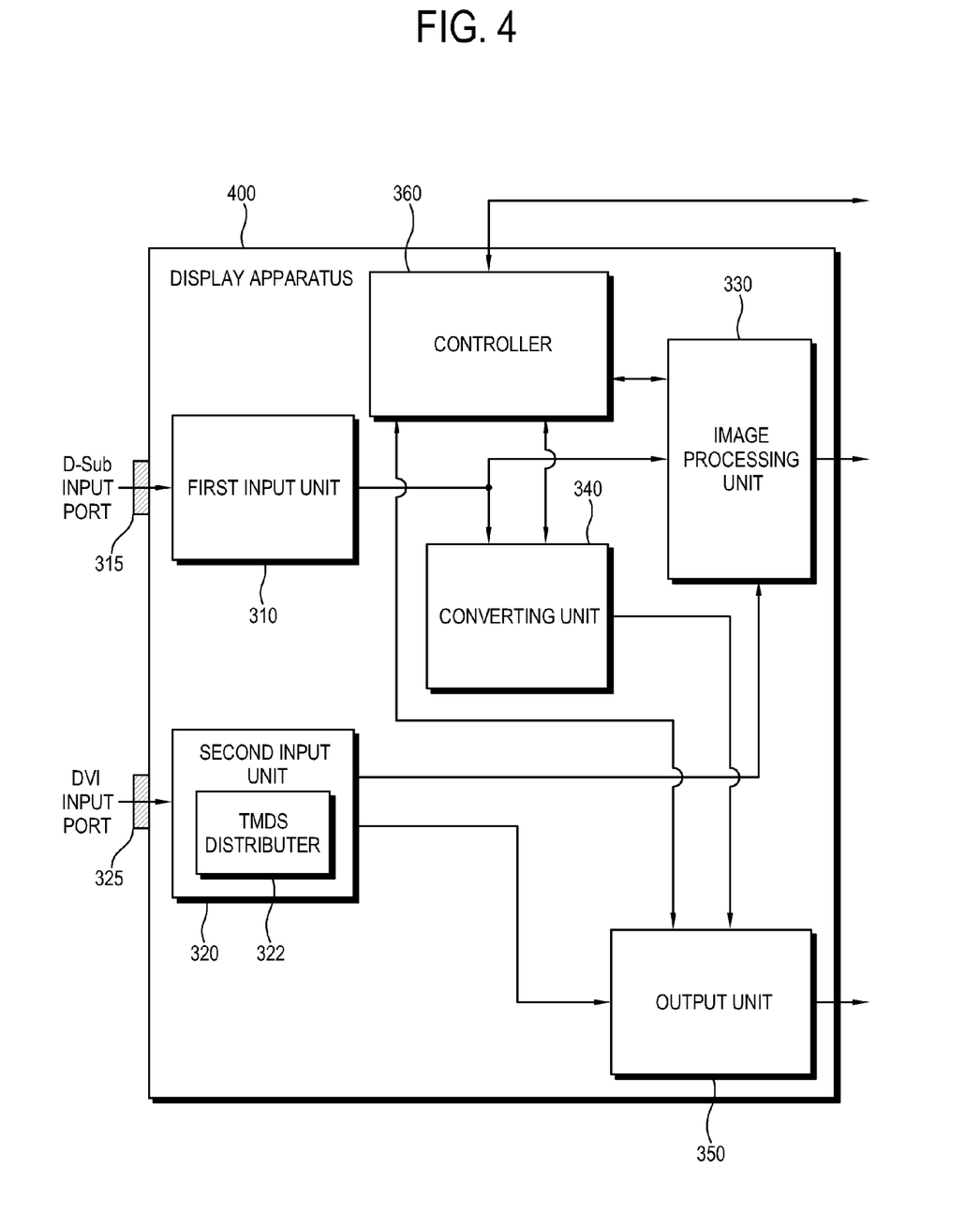
FIG. 4 is a block diagram illustrating a configuration of a display apparatus according to another exemplary embodiment of the present invention.

FIG. 4 illustrates a configuration of a display apparatus 400 according to a second exemplary embodiment of the present invention.

The display apparatus 400 converts an input analog signal into such an optimized digital signal that the next connected display apparatus can display an optimized image. The display apparatus 400 may include a first input unit 310, a second input unit 320, an image processing unit 330, a converting unit 340, an output unit 350 and a controlling unit 360. In this case, the second input unit 320 may include a TMDS distributor 322.

In the present exemplary embodiment, repetitive description referring to the same components as in the first exemplary embodiment will be omitted.

In the case that the analog signal is converted into a digital signal, specific points in a waveform of the analog signal waveform are sampled and digitized. Thus, the converted digital signal may not include all information included in the analog signal. That is, the converted digital signal is not completely identical to the analog signal. Also, in the signal converting process, jitters or noises may be generated. Accordingly, in the case that the signal type is converted, the quality of displayed image deteriorates.

To solve this problem, according to the present invention, the analog signal is converted such that an optimized image can be displayed on the connected display apparatuses.

The converting unit 340 may convert the analog signal into a digital signal. To this end, the converting unit 340 analyzes the analog signal to obtain information about where data starts and ends and at what frequency to drive a clock signal. This is referred to as an "auto adjustment" function.

Further, the converting unit 340 may convert the type of the first image signal on the basis of an optimal output value of an image outputted to the next connected display apparatus. In this respect, the converting unit 340 may convert the type of the first image signal on the basis of an optimal output value of at least one of a phase or color of the output image. The optimal output value of the image will be described later with reference to FIG. 7.

The controlling unit 360 may control the converting unit 340 to convert the type of the first image signal on the basis of the optimal output value of the image outputted to the next display apparatus. In this case, the controlling unit 360 may control the converting unit 340 to convert the type of the first image signal on the basis of the optimal output value of at least one of the phase or color of the output image.

To this end, the controlling unit 360 may perform display data channel command interface (DDC CI) communication with the next display apparatus. That is, the controlling unit 360 communicates data with the next display apparatus to transmit and receive information about color, frequency and optimal resolution. Further, the controlling unit 360 may automatically sense the next connected display apparatus through the DDC CI communication.

The image processing unit 330 and the controlling unit 360 may be integrated into a single chip. Here, the image processing unit 330 and the controlling unit 360 is embodied as one element.

Figure 5A:
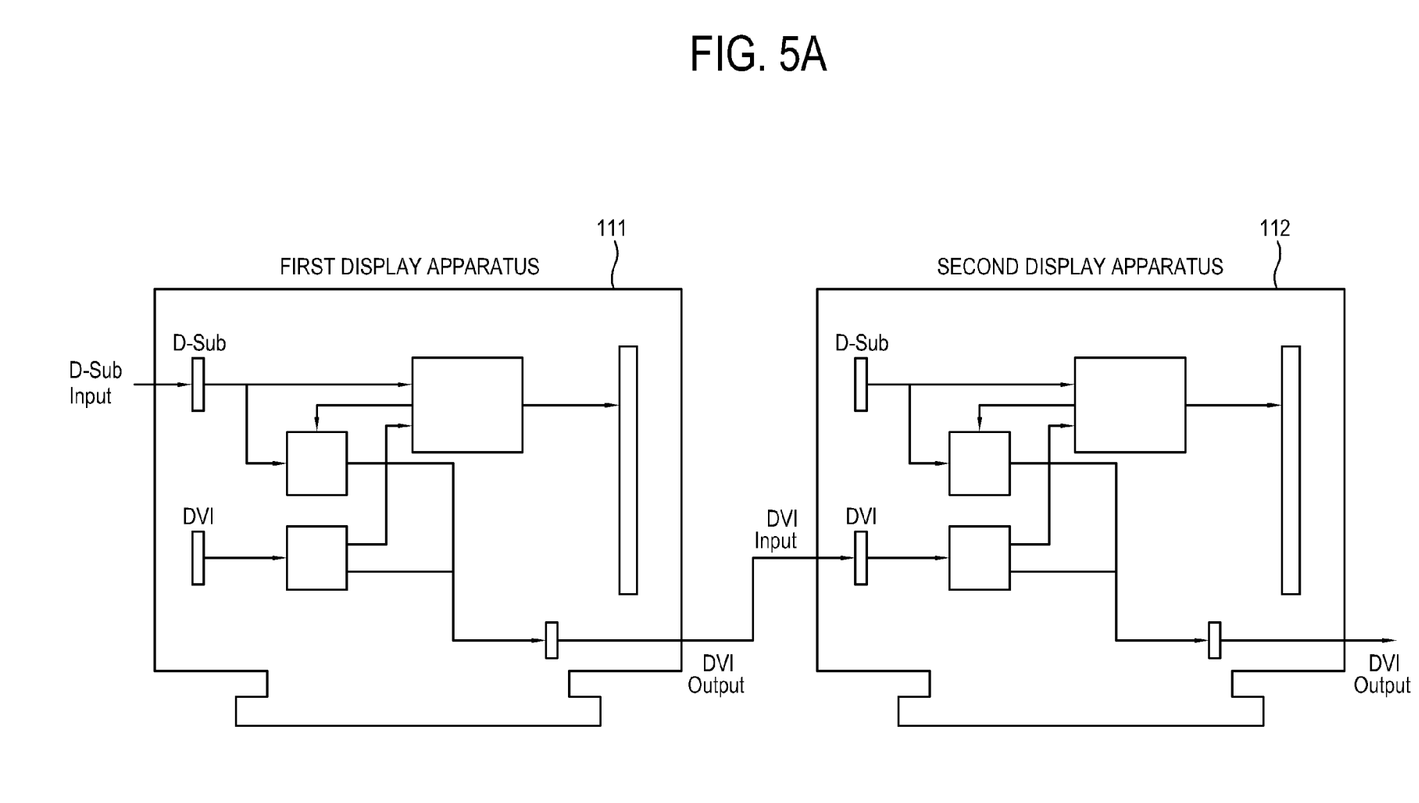
FIG. 5A illustrates an analog input in a display system according to an exemplary embodiment of the present invention.
Figure 5B:
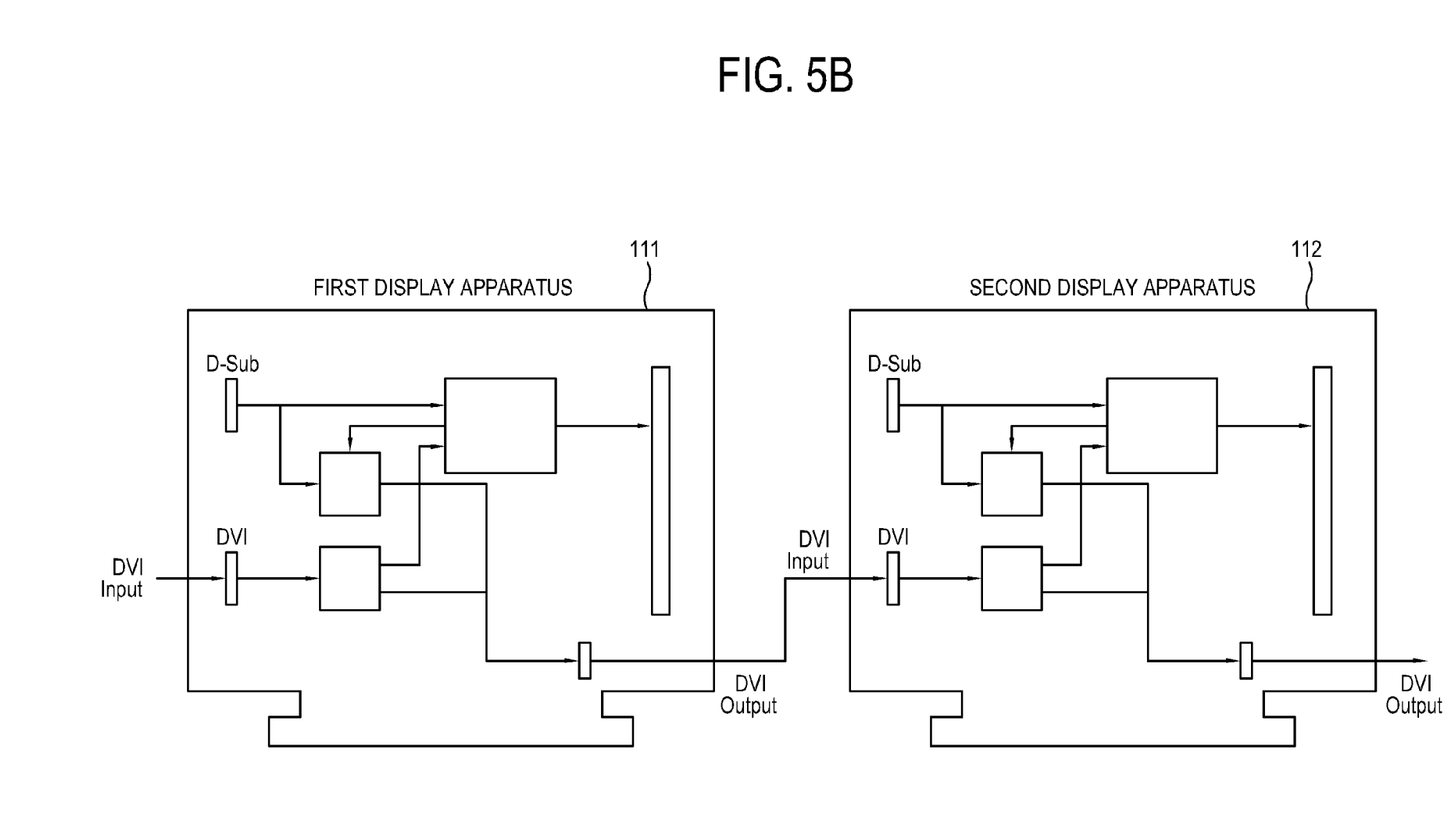
FIG. 5B illustrates a digital input in a display system according to an exemplary embodiment of the present invention.

FIG. 5A illustrates an analog signal input in the display apparatus according to the present invention, and FIG. 5B illustrates a digital signal input in the display apparatus.

An interface between a graphic card installed in a PC body and a monitor is classified into the D-Sub and the DVI.

In the D-Sub interface, the graphic card and the monitor are connected each other in an analog type. Accordingly, a digital signal outputted from the PC is converted into an analog signal for transmission to the monitor.

In the DVI interface, the graphic card and the monitor are connected each other in a digital type. Accordingly, a digital signal outputted from the PC is transmitted to the monitor as it is.

From the graphic card of the PC is outputted the digital signal. However, the D-Sub interface is used considering that most of monitors are in a cathode ray tube (CRT) format. The CRT monitor supports an interface of an analog type.

An LCD monitor which is widely used these days supports an interface of a digital type. Accordingly, in this case, a digital signal outputted from the graphic card may be transmitted to the monitor through the DVI interface.

As described above, the first display apparatus 111 and the second display apparatus 112 for realizing the conference room system are sequentially connected, in which an output port of the first display apparatus 111 is connected to an input port of the second display apparatus 112. In this respect, the first display apparatus 111 and the second display apparatus 112 may support both of the D-Sub interface and the DVI interface. Further, the first display apparatus 111 receives an analog signal or digital signal from the signal source 100 and outputs a digital signal; and the second display apparatus 112 receives the output of the first display apparatus 111 for display and then outputs a digital signal to the next display apparatus.

FIG. 5A illustrates the case that an analog signal is inputted. More specifically, the first display apparatus 111 receives an analog signal through the D-Sub input terminal 315. In this respect, the analog signal received is converted into a digital signal through a signal converting process. The first display apparatus 111 outputs the converted digital signal to the adjacent second display apparatus 112. The second display apparatus 112 outputs the input digital signal to the next connected display apparatus in a digital type.

FIG. 5B illustrates the case that a digital signal is inputted. More specifically, the first display apparatus 111 receives a digital signal through the DVI input terminal 325. In the case that the digital signal is inputted, the signal converting process is not required. Accordingly, the first display apparatus 111 outputs the input digital signal to the adjacent second display apparatus 112. Then, the second display apparatus 112 outputs the input digital signal to the next connected display apparatus in the digital type.

It is not necessarily required to convert the signal type for transmission to the next display apparatus because the quality of image to be displayed deteriorates due to type conversion. Thus, conventionally, an input signal is transmitted as it is without type conversion. That is, in the case that an analog signal is inputted from a PC, the analog signal is outputted through a distributor in the display apparatus to a plurality of display apparatuses; and in the case that a digital signal is inputted from the PC, the digital signal is outputted through the distributor to the display apparatuses. Thus, in the case that the analog signal is transmitted, the image quality in the N-th display apparatus has deteriorated from the signal input into the first display apparatus.

On the other hand, according to the present invention, an input analog signal is converted into a digital signal and outputted to the next connected display apparatus. Accordingly, the image quality in the N-th connected display apparatus does not deteriorate.

Further, as the PC generates various outputs, the conventional display apparatus should be provided with an analog output port and a digital output port corresponding to the digital signal and the analog signal from the PC. That is, an output line with the D-Sub and an output line with the DVI should be provided.

However, according to the present invention, as an analog signal is converted into a digital signal, the display apparatus only has to be provided with an output line with the DVI. Further, according to the present invention, various input signals having different types may be outputted through one output line.

Figure 6:
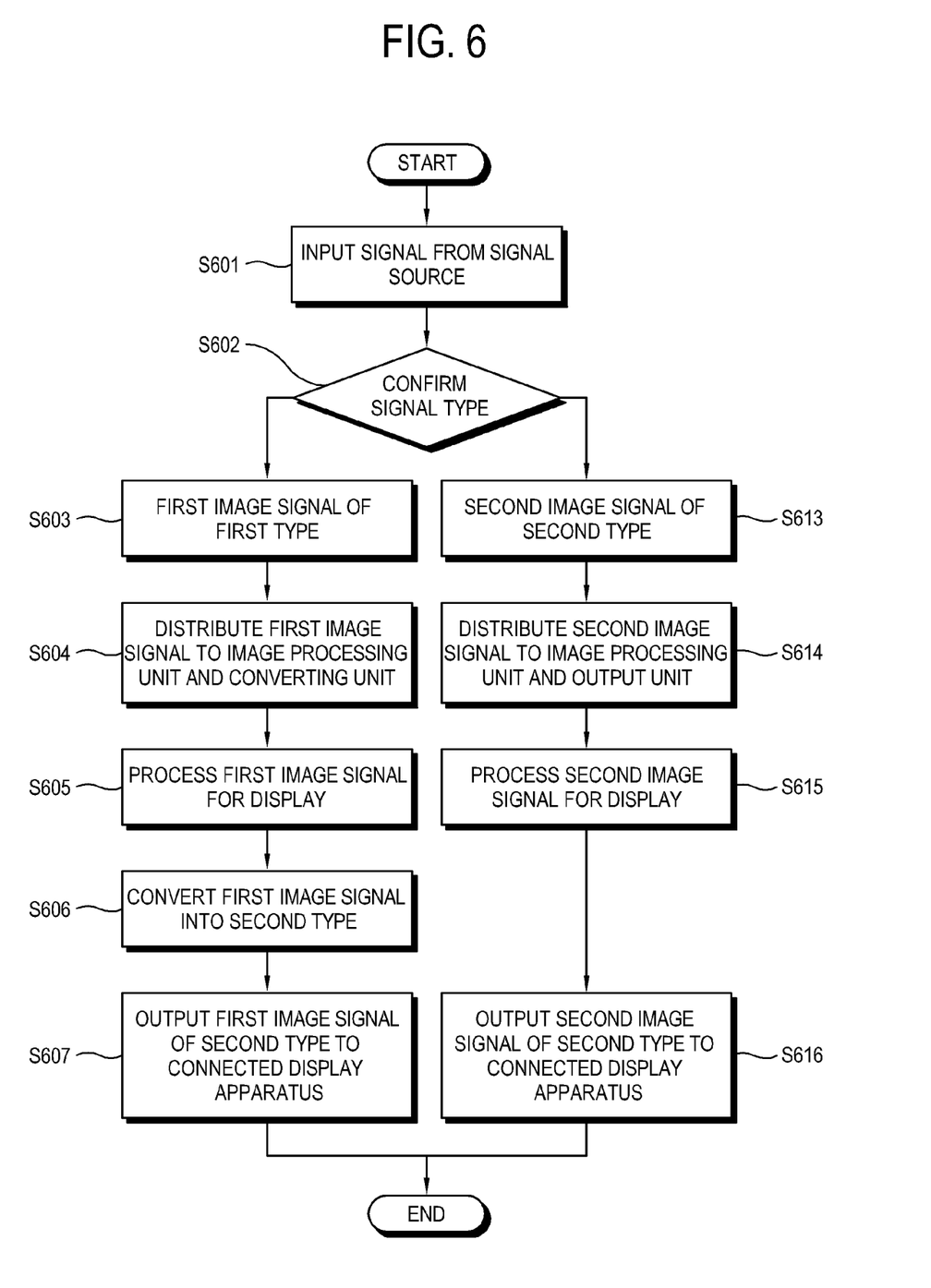
FIG. 6 illustrates a display process in a display apparatus according to an exemplary embodiment of the present invention.

FIG. 6 illustrates a display process in a display apparatus according to an exemplary embodiment of the present invention.

Firstly, a signal is inputted from the signal source 100 (S601). Then, the display apparatus 300 confirms the type of the input signal (S602).

If the input signal is a first image signal of a first type, for example, an analog type (S603), the display apparatus 300 distributes the first image signal to the image processing unit 330 and the converting unit 340 (S604). More specifically, the input analog signal is inputted to the image processing unit 330 for driving an image screen and to the converting unit 340 for converting the analog signal to a digital signal.

The image processing unit 330 processes the first image signal of the first type for display (S605).

The converting unit 340 converts the first image signal of the first type into a second type, for example, a digital signal (S606).

The display apparatus 300 outputs the first image signal of the second type to the next connected display apparatus (S607).

If it is determined in operation S602 that the input signal is a second image signal of the second type, that is, a digital signal (S613), the display apparatus 300 distributes the second image signal of the second type to the image processing unit 330 and the output unit 350 (S614). More specifically, the display apparatus 300 distributes the input digital signal to the image processing unit 330 for driving the image screen and the output unit 350 for outputting the input digital signal to the next connected display apparatus.

The image processing unit 330 processes the second image signal of the second type for display (S615).

The display apparatus 300 outputs the second image signal of the second type to the next connected display apparatus (S616), thereby completing the display process.

Figure 7A:
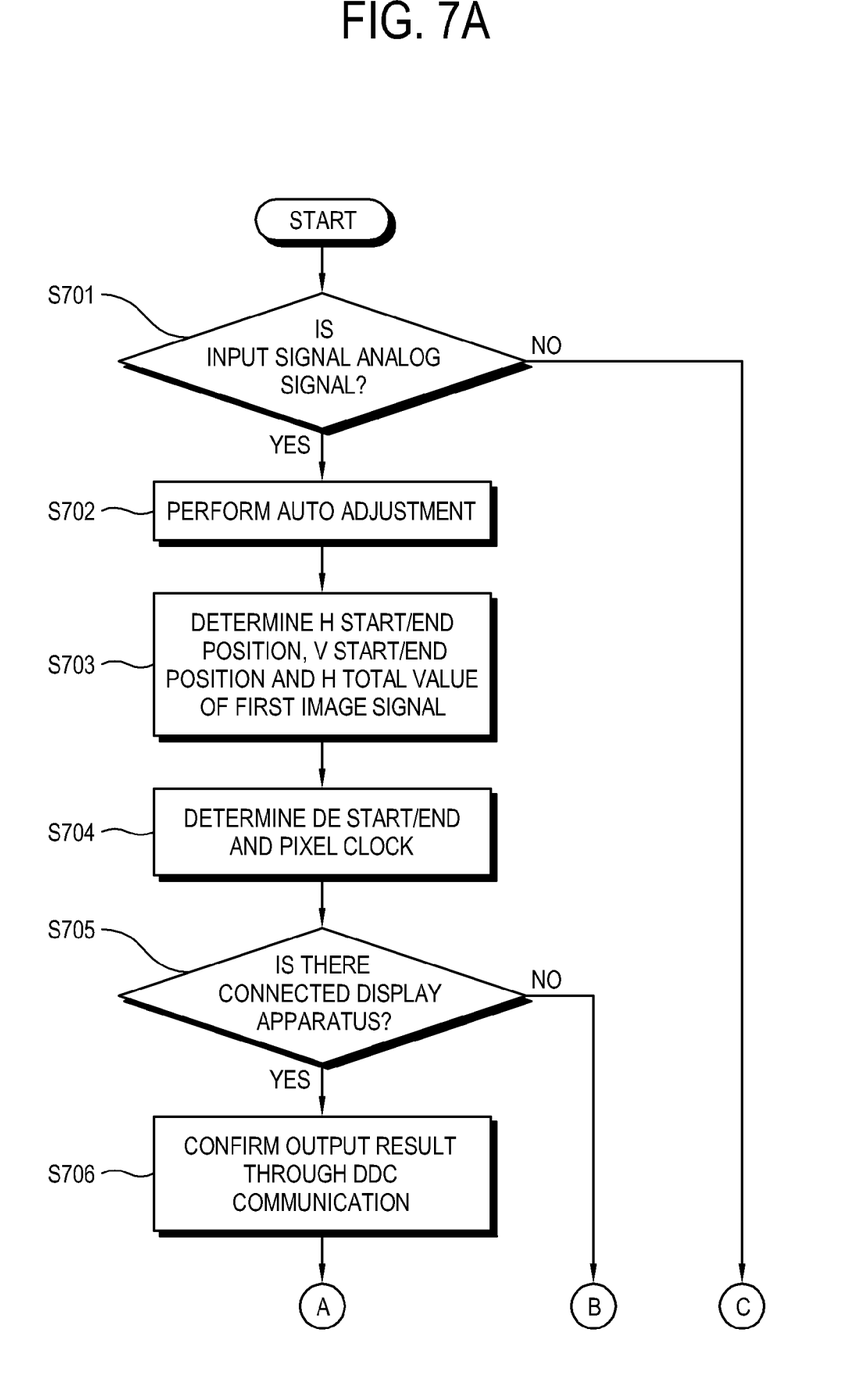
FIGS. 7A and 7B illustrate a signal conversion process in a display apparatus according to another embodiment of the present invention.
Figure 7B:
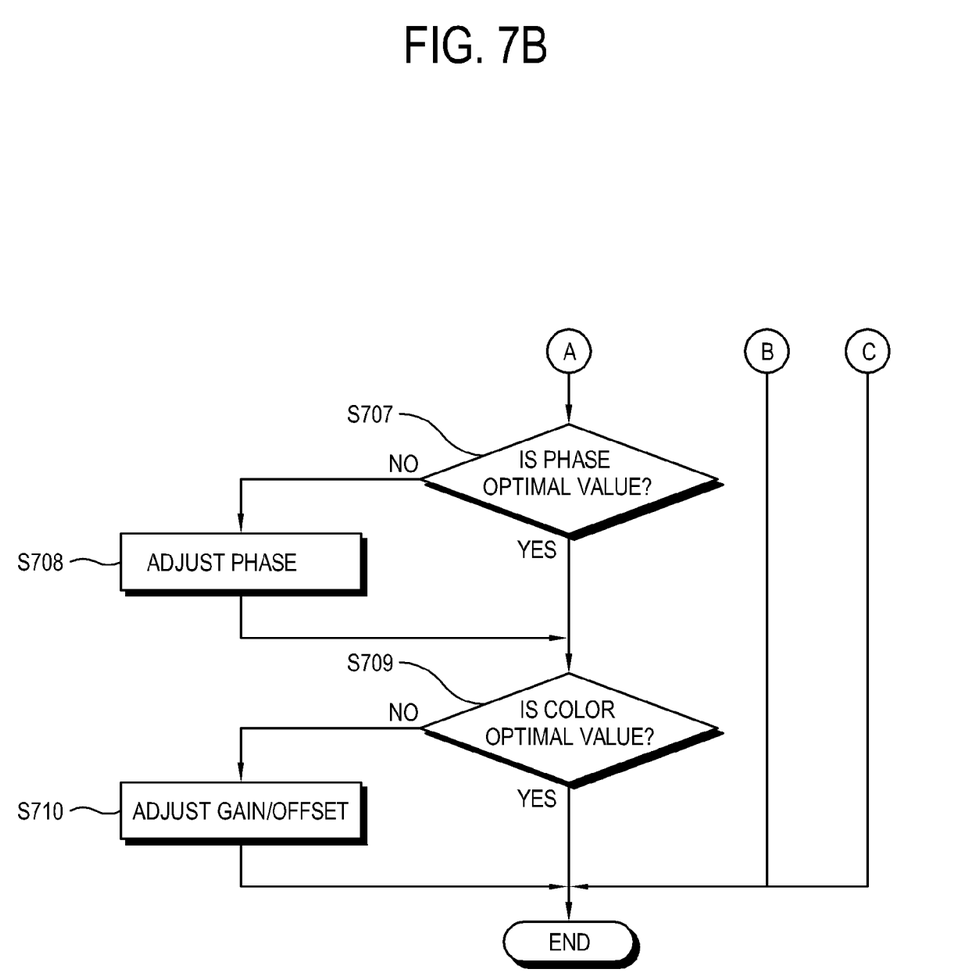

FIGS. 7A and 7B illustrate a signal conversion processes in a display apparatus according to another exemplary embodiment of the present invention.

A user can directly select an output type of an input signal. That is, the user can determine whether to output the input signal to the next display apparatus without conversion or to output the input signal to the next display apparatus through conversion. Also, the user can determine which input signal is to be converted and in which type an input signal is to be converted to. In FIG. 7, it is assumed that the user converts an input analog signal into a digital signal for output.

Firstly, the display apparatus 400 determines whether an input signal is an analog signal (S701).

If it is determined that the input signal is not an analog signal, the procedure terminates.

If it is determined that the input signal is an analog signal, the display apparatus 400 performs auto adjustment (S702). More specifically, the converting unit 340 determines an H Start/End position, a V Start/End position and an H total value of the analog signal, that is, the first image signal (S703). In this respect, the Start/End position becomes a reference of a data enable (DE) signal when making a digital signal; and the H total value is used for generating a pixel clock value. Accordingly, the converting unit 340 determines the DE Start/End and a pixel clock using data acquired in operation S703 (S704).

Then, the controlling unit 360 determines whether an output port of the current display apparatus is connected to the next display apparatus (S705). In this respect, the controlling unit 360 may automatically sense the next connected display apparatus through the DDC CI communication.

If there is no next connected display apparatus, it is not necessary to optimize the image screen, and thus, the procedure terminates.

On the other hand, if there is the next connected display apparatus, the controlling unit 360 confirms the output result through the DDC communication (S706). More specifically, the display apparatus 400 converts an analog signal into a digital signal and then outputs the converted digital signal to the next connected display apparatus.

In this case, the connected display apparatus calculates the total sum of differences between adjacent two pixels, and transmits the calculation result according to request of the display apparatus 400. An optimal phase value is acquired when the calculation result reaches a maximum. In the case of color, an optimal color value is acquired when a maximum of an RGB data value of an image screen currently displayed on the next connected display apparatus is 0xff and a minimum thereof is 0.

The controlling unit 360 determines whether a phase has an optimal value (S707).

If the phase does not have the optimal value, the controlling unit 360 adjusts the phase (S708). That is, the controlling unit 360 drives the converting unit 340 while changing an overall adjustment range of the phase to finally determine a value when the phase of the image screen displayed on the next connected display apparatus is optimized.

If it is determined that the phase is optimized in the operation S707, the controlling unit 360 performs operation S709.

The controlling unit 360 determines whether the color has an optimal value (S709).

If the color does not have the optimal value, the controlling unit 360 adjusts the color (S710). A method for adjusting the color is identical to the method for adjusting the phase. That is, the color is determined by confirming an image screen displayed on the next connected display apparatus.

The controlling unit 360 controls the converting unit 340 to convert the first image signal on the basis of the optimal output value of the image screen displayed on the next display apparatus. In this respect, the converting unit 340 converts the analog signal into the digital signal on the basis of an H sync signal and a V sync signal for changing the analog signal into the digital signal, De Start/End information, clock information, offset and gain inputted from the controlling unit 360.

If it is determined in operation S709 that the color has the optimal value, the procedure terminates.

As described above, according to the present invention, an analog signal is converted into a digital signal so that an optimized image can be displayed on the next display apparatus. Accordingly, an N-th connected display apparatus can display an optimized image without deterioration.

Although a few exemplary embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A display apparatus comprising:
a first input unit through which a first image signal having a first type is inputted;
an image processing unit which processes the first image signal for display;
a converting unit which converts the type of the first image signal into a second type different from the first type;
an output unit which outputs the first image signal converted into the second type to an input unit of a next connected display apparatus; and
a controlling unit which controls the converting unit to convert the type of the first image signal on the basis of an optimal output value on the next connected display apparatus.

2. The display apparatus according to claim 1, further comprising a second input unit through which a second image signal having the second type is inputted.

3. The display apparatus according to claim 2, wherein the image processing unit processes the input second image signal for display.

4. The display apparatus according to claim 2, wherein the output unit outputs the second image signal to the next connected display apparatus.

5. The display apparatus according to claim 2, the first image signal is an analog signal, and the second image signal is a digital signal.

6. The display apparatus according to claim 5, wherein the second input unit comprises a transition minimized differential signaling (TMDS) distributor which distributes the second image signal to the image processing unit and the output unit.

7. The display apparatus according to claim 1, wherein the controlling unit controls the converting unit to convert the type of the first image signal on the basis of an optimal output value of at least one of a phase and color of the image screen.

8. The display apparatus according to claim 1, wherein the controlling unit performs a display data channel command interface (DDC CI) communication with the next connected display apparatus.

9. A display system comprising a first display apparatus and a second display apparatus which are connected to each other,
the first display apparatus processing an input first image signal having a first type or an input second image signal having a second type different from the first type for display, converting the type of the first image signal into the second type, and outputting the first image signal converted into the second type or the second image signal to the second display apparatus connected to the first display apparatus, and
the second display apparatus processing the first image signal converted into the second type or the second image signal which is inputted from the first display apparatus for display, and outputting the first image signal converted into the second type or the second image signal to a next connected display apparatus,
wherein the first display apparatus converts the type of the first image signal on the basis of an optimal output value on the second display apparatus.

10. A display method in a display apparatus comprising:
receiving a first image signal having a first type;
processing the first image signal for display;
converting the type of the first image signal into a second type different from the first type;
outputting the first image signal converted into the second type to a next connected display apparatus; and
converting the type of the first image signal on the basis of an optimal output value on the next connected display apparatus.

11. The display method according to claim 10, further comprising receiving a second image signal having the second type.

12. The display method according to claim 11, further comprising processing the second image signal for display.

13. The display method according to claim 11, further comprising outputting the second image signal to the next connected display apparatus.

14. The display method according to claim 11, wherein the first image signal is an analog signal, and the second image signal is a digital signal.

15. The display method according to claim 14, further comprising distributing the second image signal to an image processing unit and an output unit which are provided in the display apparatus.

16. The display method according to claim 10, wherein the converting comprises converting the type of the first image signal on the basis of at least one of a phase and color of the image screen.

17. The display method according to claim 10, further comprising performing a display data channel command interface (DDC CI) communication with the next connected display apparatus.

18. A signal propagation system comprising:
a signal source which generates and outputs a signal to a plurality of display apparatuses connected to each other,
wherein the signal source provides a signal to an input of a first display apparatus among the plurality of display apparatuses, and the first display apparatus outputs a signal to an input of a second display apparatus, and the providing continues in such a way until a last display apparatus among the plurality of display apparatuses has received the signal, when the signal is in a first type which is an analog type, converting units in each of the plurality of display apparatuses optimizes the signal such that the signal does not deteriorate while being provided to the plurality of display apparatuses, and the controlling units further display the signal in display units of each of the plurality of display apparatuses.

19. A signal propagation method comprising:

receiving a first image signal in a first type;

processing the first image signal for display;

converting the first image signal from a first type to a second type;

outputting the converted first image signal to an initial display apparatus of a plurality of display apparatuses; and propagating the converted first image signal from the initial display apparatus to subsequent display apparatuses of the plurality of apparatuses serially, until the last display apparatus in the plurality of display apparatuses is reached.

* * * * *